Patented Dec. 28, 1948

2,457,160

UNITED STATES PATENT OFFICE 2,457,160

PHENOL-ALDEHYDE SEALING AGENT AND METHOD OF MAKING THE SAME

Stewart S. Kurtz, Jr., Merion, and James S. Sweely, Swarthmore, Pa., assignors to Sun Oil Company, Philadelphia, Pa., a corporation of New Jersey No Drawing. Application August 9, 1945, Serial No. 609,927

11 Claims. (Cl. 260—29.3)

REISSUED
JUL 24 1951
RE 23393

This invention relates to sealing agents and the preparation thereof and more particularly to improved sealing compositions adapted for plugging porous subterranean formations.

The novel sealing agents of the present invention comprise an aqueous suspension of thermosetting resin partially condensed to a particular stage of condensation, as hereinafter fully described, and capable of further condensation to a hard infusible stage.

In the drilling of wells for oil, gas or other fluids the well bore traverses numerous formations or strata of varied porosity, such as cavernous limestone, gravel beds, oil-bearing sands, cavernous sandstones, water-bearing sands, gas-bearing sands and the like. It is frequently necessary or desirable for one reason or another to seal off certain of these formations from the borehole and many methods for effecting such sealing have been proposed. In drilling by the rotary method a drilling mud is circulated during the general drilling operation down through the drill pipe to the drill bit and thence back to the surface to overcome the formation pressure, lubricate the bit, carry cuttings to the surface and to wall off the borehole. It is not infrequent, however, that formations are encountered which are sufficiently porous that the mud fluid passes into the formation so that little or no mud returns to the surface. This condition, which is known as "lost circulation," may also be due to a breakdown of one or more of the formations traversed, caused by the high hydrostatic pressure exerted by the mud column on the formation as when the mud fluid has been heavily weighted with weighting material. In such cases steps must be taken to seal off the porous formation and prevent the loss of mud fluid. Again, it is often desirable to plug off certain strata in order to prevent or minimize ingress of undesirable fluids into the well. For instance, it may be desired to seal off water-bearing sands to increase the ratio of oil to water production.

Formerly it was general practice to accomplish such sealing operations by pumping cement grout into the well, forcing it into the porous formation, permitting it to harden in place and then drilling through the cement remaining in the borehole. Although in the case of lost circulation it has become customary more recently to add special sealing agents such as ground sugar cane stalks, mica or Cellophane to the drilling fluid to improve its sealing properties, this has often proved unsuccessful, and consequently cementing operations are still used to an extent to overcome this condition. Since it is often impossible to determine the exact zone of lost circulation, a considerable amount of cement grout (sometimes five hundred feet or more) may have to be allowed to set within the borehole in order to insure sealing of the porous formation. It frequently happens that in drilling through the hardened cement the hole becomes sidetracked into the adjacent formations, thus requiring redrilling of all the hole below the point of sidetracking, perhaps including the zone of lost circulation. Similar disadvantages accompany the use of cement in sealing off water sands. A further disadvantage may arise due to the possibility that, in some cases, the cement may be forced into the oil-bearing formation to a distance sufficient to make it difficult or impossible subsequently to open the formation for production by the usual gun perforation methods.

More recently the use of resin-forming liquids capable of condensing to a solid resin under the influence of the formation temperature in place of cement has become known and has attained a limited applicability particularly in sealing water-bearing sands. While such resin-forming liquids offer certain advantages over cement, such as greater fluidity resulting in improved sealing properties and better resistance to natural brines and to acid such as used in acidizing wells, they fail to overcome the above discussed disadvantages which accompany the use of cement. Like cement, these resin-forming liquids solidify in the borehole, necessitating redrilling of that portion of the hole which thereby becomes plugged. Also, due to the greater fluidity of the resin-forming liquids as compared to cement grout, they are even more apt to penetrate an oil-bearing stratum to such extent that subsequent opening of the stratum for production becomes impossible. A further disadvantage of this type of sealing agent arises when there are substantial variations in penetrability of the earth surrounding the portion of the borehole to be sealed off, as occurs in the case of a highly porous formation adjacent to a less porous formation or as may be caused by crevices within a formation. In such cases a very large amount of the resin-forming liquid may be forced into the more penetrable portions of the surrounding earth before an effective seal of the less penetrable portions is obtained, with the result that the expense involved in carrying out the sealing operation becomes excessive.

The present invention is directed to and provides an improved sealing agent which overcomes the above-discussed disadvantages of sealing agents heretofore employed. The novel sealing compositions according to this invention comprise a suspension of a thermosetting resin in water, the resin being partially condensed to a particular intermediate stage requisite to impart to the suspension the desired sealing characteristics. This particular stage of condensation may be described as an intermediate plastic solid stage. The partially condensed resin corresponding thereto is dispersible in water, by conventional mechanical means and without the aid of an emulsifying agent, to a state which is substantially non-coalescing for at least five hours, i. e. the dispersed resin particles do not coalesce substantially when the suspension is permitted to stand for this period of time. Within this particular stage of condensation there is a preferred condensation range at which the resin is capable of forming a suspension which is substantially permanently stable with respect to coalescence of the dispersed resin particles. The suspension obtained by dispersing in water the resin corresponding to the aforesaid particular intermediate plastic solid stage, which suspension constitutes the sealing agent of the present invention, is characterized by its ability, when forced into a bed of granular material such as sand or gravel having void spaces substantially larger than the size of the dispersed resin particles, to form a resin plug at the face of the bed, which, upon application of heat, will condense to a hard layer non-porous to drilling fluids. In other words, the suspension is capable of forming a resin plug or sheath at the face of a porous body without any considerable penetration of the resin into the body even though the latter has pores or voids which are substantially larger than the dispersed resin particles. Further, this resin plug under the influence of heat will condense to a hard sheath impervious to drilling fluids and having considerable mechanical strength as distinguished from a crumbly or powdery resin layer.

The aqueous suspensions of the present invention have the great advantage over previously known sealing agents of not forming a difficultly drillable solid mass within the well bore. While the resin particles of the suspension which remains in the borehole may coalesce to an extent with time, the coalesced resin upon curing under borehole conditions does not become the hard solid mass that is obtained when a resin-forming liquid or cement grout is used as the sealing agent. Furthermore, after the resin layer has been plastered out on the borehole wall, setting of unplastered resin to a solid mass within the borehole may be minimized or prevented by flushing out the suspension before the resin has had time to cure. This may be accomplished by circulating a stream of water into and out of the borehole, preferably slowly to insure against the possibility of flushing out part of the plastered resin layer. The resin layer remaining on the borehole wall and slightly penetrating the adjacent formation cures under the formation temperature to a hard non-porous sheath which generally may be of the order of one-quarter to one inch thickness. Thus, any oil-bearing stratum which has been sealed off may readily be opened up for production by the usual gun perforation method. A further advantage results from the ability of the suspension to plaster out at the face of even a very porous formation, such as one-quarter inch gravel, since this characteristic prevents deep penetration of the resin into the formation and thus reduces to a minimum the amount of resin required to obtain an effective seal. Also the fact that the sealing agent which remains in the borehole is composed partly of water instead of entirely of resin further reduces the amount of resin required for carrying out the operation.

As starting materials for producing the partially condensed resin, it is preferred to use reactants of the phenol-formaldehyde type and particularly phenol and formaldehyde. However, other materials capable of forming thermosetting resins may be employed to produce satisfactory sealing agents according to the invention. Among other types of thermosetting resins which are useful may be mentioned the following: urea-formaldehyde, melamine-formaldehyde, and phenol-furfural resins. With all such types the successful preparation of a suspension suitable as a sealing agent depends on carrying the condensation reaction to that particular intermediate plastic solid stage which we have found provides the characteristics required of the present products.

The first step in the procedure of preparing the sealing agent comprises reacting the starting material under condensation conditions to the desired stage. Selection of the proper reaction conditions, such as the proper quantities of reactants, the type and amount of catalyst and the reaction temperature, will depend on the particular reactants employed. Since the preparation of thermosetting resins is well known, the proper selection of reaction conditions for any particular case will be readily within the skill of the art. Some of the aforesaid starting materials are known to react slowly while others tend to react very rapidly. It is primarily necessary that conditions be chosen so that the reaction will proceed at a rate such that it can be stopped when the proper stage of partial condensation is reached.

In an early stage of the reaction, the product is still liquid. While this form of product can be dispersed in water, the dispersed resin rapidly coalesces, thus requiring a good emulsifying agent if a relatively stable suspension is to be formed. When a non-coalescing dispersion is obtained by employing such emulsifying agent, the resulting emulsion is so stable as to lack the ability to function properly as a sealing agent, the resin particles merely passing through a porous material such as sand or gravel.

In a further stage of the reaction a sticky semi-liquid is obtained which cannot be dispersed by means of a conventional stirring device such as a motor-driven agitator. On continuing the reaction still further, the product takes on more of a solid character and passes through a stage at which it is a sticky or gummy semi-solid which is dispersible in water but which soon coalesces after dispersion. If the reaction is allowed to proceed past this stage, the resin will reach that desired intermediate plastic solid stage at which it is still sufficiently soft to be dispersible in water by conventional means but not so soft or gummy as to fail to give a suspension which is substantially stable for a reasonable time, such as at least five hours. Preferably the reaction is carried well into this intermediate plastic solid stage in order to reach the preferred condensation range at which the resin is dispersible to a substantially non-coalescing state.

On the other hand, if the reaction is allowed to proceed too far, the resin will become too tough or hard for the suspended particles, upon plastering and curing on sand or gravel, to fuse together properly and thereby produce a resin layer having good mechanical strength. More or less concurrently although not exactly so, the resin will tend to lose its ability to be dispersed in the conventional manner or at least will be dispersible only with great difficulty. The first indication, however, that the reaction is being carried past the desired stage is shown by the nature of the resin layer obtain on forcing an aqueous suspension of the resin product into a body of sand or gravel. Although the resin may still be suspendible and may plaster out from the suspension at the face of the porous material, the resulting resin layer after curing under the influence of heat will tend to have poorer mechanical strength, being hard but brittle if the reaction has proceeded somewhat further than is desirable and then becoming crumbly or powdery if the reaction has proceeded substantially past the desired stage.

The range in degree of condensation between a product which is too soft and one which is too hard to produce a suitable sealing agent is rather limited. It is important that the reaction be stopped within this range and preferably well within the range for this gives a product which is readily dispersible to a non-coalescing state, which will plaster out of the suspension properly yielding a resin layer which on curing becomes a strong non-porous sheath, and which, an addition, can withstand a reasonable amount of preheating of the suspension without substantial loss of plastering and curing qualities. This last-named property of retaining the desired sealing characteristics even after the suspension has been heated for a reasonable time (e. g., one hour at 150° F. or one-half hour at 200° F.) serves, in practice to insure effective sealing of the formation even when there is a substantial interval between the time of introducing the suspension into the borehole and the time it reaches, and the resin plasters out on, the formation.

The final step in the preparation of the sealing agent comprises forming the resin-in-water suspension. This may be carried out simply by vigorously mixing together the resin and water as by means of a motor-driven stirrer. In cases where a catalyst has been used to promote the condensation reaction, the catalyst preferably is washed out of the partially condensed resin at this point in order to minimize further condensation of the dispersed resin and permit the suspension to be stored, if desired, for a reasonable time without loss in sealing quality (say, for two or three weeks at room temperature or for two or three months under refrigeration). This may be accomplished by first agitating the partially condensed resin with several volumes of water until is is well dispersed, allowing the mixture to stand for a short time sufficient to permit dispersed particles to settle and form a concentrated suspension as the lower layer, decanting the excess water, then mixing the concentrated suspension with additional quantities of water and repeating the procedure until substantially all of the catalyst has been removed. The resultant concentrated suspension obtained after final decantation of excess water generally contains in the order of 25–60% water. This product may be permitted to stand for a prolonged period without substantial coalescence of the dispersed resin particles, provided the degree of condensation of the resin is well within the described range. Some of the concentrated suspensions, depending upon the particular starting materials and reaction conditions used, exhibit thixotropic properties, i. e. they become gel-like on standing but readily become fluid again when mildly agitated. While this thixotropic characteristic seems to be largely coextensive with the desired sealing properties for certain products, this is not true in all cases, since many suspensions may be prepared which have all of the desired qualities of a sealing agent according to the invention but which exhibit no thixotropy.

The procedure described above applies generally for the various types of reactants which may be used to form the thermo-setting resin. Within the general procedure described, some variation in specific details of operation will be necessary depending on the particular reactants selected. For example, with certain starting materials a catalyst will be required to promote the reaction while with others the reaction will proceed rapidly without a catalyst. With phenol and formaldehyde as the reactants, either an acid or alkaline catalyst may be used. Examples of suitable acid catalysts are hydrochloric acid, sulfuric acid, phosphoric acid and sulfanilic acid. Among suitable alkaline catalysts are included sodium, potassium and ammonium hydroxides, sodium carbonate and sodium bicarbonate. On the other hand, when urea and formaldehyde are used as the starting materials, the reaction occurs rapidly in the absence of any catalyst. Again, when the starting material contains a large proportion of water as is the case in preparing phenol-formaldehyde resins, the partially condensed resin may precipitate from the reaction mixture during the course of the reaction thus necessitating subsequent separation of the resin from the rest of the reaction mixture. However, with material such as phenol-furfural, as also with urea-formaldehyde, all of the reaction mixture is converted into resin so that such separation step is not required.

The appearance of the reaction mixture seems to be the best means of determining when the proper stage of condensation has been reached. This means of judging when to stop the reaction, of course, requires experience on the part of the operator in preparing the product. Furthermore, the appearance of the reaction mixture will vary greatly for different starting materials and to a lesser degree with different reaction conditions, thus requiring that the operator be more or less familiar with the appearance of the reaction mixture at the various stages of condensation for any given case. However, a skilled operater after making several runs and testing the product to see if it has the desired characteristics will readily be able to determine the proper point for stopping the reaction.

For the purpose of illustration, a more detailed description of the reaction stages observed in the preparation of phenol-formaldehyde resins is given. This class of product may be subdivided into two groups: (1) alkali catalyzed and (2) acid catalyzed. In preparing either type, phenol and formalin (which consists of about 40% formaldehyde in aqueous solution) are mixed in any suitable proportions such as from one to four parts of formalin per part of phenol by weight, and the mixture is heated to a suitable reaction temperature such as 80–100° C. in the presence of a small amount of catalyst. At the beginning of the reaction the mixture is a homogeneous solution having the appearance of water. As the reaction proceeds it turns milky and becomes more and more opaque until a resin phase precipitates which is fluid even at room temperature. On further reacting, the resin becomes less and less fluid, passing through a stage at which it may be a viscous sticky fluid at the reaction temperature but a soft gummy semisolid or solid at room temperature. In this form the resin either is practically non-dispersible in water by conventional means or, if dispersible, gives a suspension the dispersed particles of which readily coalesce.

Further reaction causes the resin to reach that intermediate plastic solid stage at which the reaction should be stopped. At this stage, the alkali catalyzed product, while at the reaction temperature, generally has a gel-like appearance and a consistency much like set gelatin, as may be tested by inserting a glass rod into the reaction mixture. When cooled, this product retains its gel-like appearance but becomes considerably tougher although still pliable. In the case of the acid catalyzed product, the resin at the reaction temperature has the appearance of a soft gummy solid or even a sticky viscous fluid and when cooled to room temperature becomes considerably tougher. Those acid catalyzed products which have been reacted well into the desired stage of condensation have the appearance at room temperature of an elastic or rubbery solid.

If the reaction is allowed to proceed still further, the product becomes tougher and more difficult to suspend. As previously described, the best evidence of passing the desired stage of condensation is reflected in the nature of the resin plug obtained by forcing a suspension of the product into sand or gravel and permitting the resin layer to cure under the influence of heat. If the degree of condensation is beyond, but not too far beyond, the preferred stage, the cured resin plug or sheath obtained will still be non-porous but will have a brittle character. Further reaction will cause the resin plug to become crumbly and eventually porous and powdery on curing. At the same time, it will become more and more difficult to effect dispersion of the resin, until finally the resin will reach such a state of hardness that, for all practical purposes, it will be non-dispersible.

The following examples, in which parts are by weight, serve to illustrate the invention more specifically:

Example I

A series of runs was made in which phenol-formaldehyde resins of the alakli catalyzed type were prepared. In each run, 100 parts of phenol were mixed with 300 parts of formalin and the mixture was heated to a temperature of about 95° C. and reacted at this temperature in the presence of one part of sodium hydroxide (added as a 7% aqueous solution). The runs differed only in the time of reaction, this being measured from the time when the catalyst was added to the heated reactants. During the reaction the mixture was constantly stirred by means of a motor-driven stirrer and the temperature was maintained at about 95° C. by means of a constant temperature bath surrounding the reaction vessel. After the reaction had been stopped, the resin was separated from the rest of the reaction mixture and the separated resin was tested for dispersibility and sealing qualities. The ability to form a non-coalescing suspension was determined by mixing with water in the manner described hereinbefore, during which step the catalyst was washed out of the resin by mixing with water and decanting the excess water several times. The sealing qualities were determined by forcing the resulting suspension into a bed of 10 mesh sand, then curing the resin filter cake at a temperature of 200° F. and observing the character of the cured cake. The following results were obtained:

Reaction time=160 minutes: The resin, which separated from solution only after the reaction mixture was cooled, was a sticky viscous liquid and could not be suspended.

Reaction time=175 minutes: The resin separated as a viscous liquid phase at reaction temperature and became a soft sticky solid when cooled. This product, although difficult to disperse, could be suspended but the dispersed particles coalesced when the suspension was allowed to stand overnight.

Reaction time=180 minutes: The resin was less sticky than in the previous run and formed a substantially non-coalescing suspension. The product gave a filter cake which cured in 7 hours to a hard non-porous layer.

Reaction time=190 minutes: The resin was a gelatinous solid which toughened considerably on cooling to room temperature. It formed a non-coalescing thixotropic suspension capable of plastering out and curing to a hard non-porous layer in 5 hours. Precuring of the suspension for one-half hour at 200° F. before filtration reduced the cure time to three hours and caused only a slight decrease in strength of the cured filter cake.

Reaction time=205 minutes: Similar to 190 minute run.

Reaction time=215 minutes: Similar to 190 minute run.

Reaction time=230 minutes: Similar to 190 minute run except that resin was substantially tougher and the filter cake required a shorter time to cure. Also precuring of the suspension caused greater loss in strength, giving very brittle resin layer after the filter cake had been cured for 2½ hours at 200° F.

Reaction time=240 minutes: Resin somewhat tougher than in 230 minute run and more difficult to disperse. Suspension tended to give cured filter cake which was brittle. Precuring of suspension resulted in crumbly or powdery filter cake.

Reaction time=280 minutes: Resin harder than in 240 minute run but still suspendible. Suspension gave an unsatisfactory, crumbly filter cake even without precuring.

Reaction time=330 minutes: The resin was sufficiently hard that it could not be suspended.

Example II

Another series of runs was carried out under conditions as described in Example I except that 0.5 part concentrated sulfuric acid was used as the catalyst. The results were as follows:

Reaction time=75 minutes: The resulting resin phase remained fluid even after cooling to room temperature. It could not be suspended in water.

Reaction time=110 minutes: The resin was liquid at the reaction temperature and became a very sticky semi-liquid when cooled to room temperature. It likewise could not be suspended.

Reaction time=120 minutes: The resin was a viscous fluid at reaction temperature and a sticky semi-solid at room temperature. In two runs made under these conditions, the product was non-dispersible in the conventional manner. In a third run, the product was dispersible but formed a suspension in which the resin particles coalesced after the suspension had been permitted to stand for several hours. This shows that the conditions of this run represent about the borderline between a product which is practically non-dispersible and one which may be dispersed to form a suspension.

Reaction time=130 minutes: Product was a viscous liquid at reaction temperature but less sticky at room temperature than in previous run and could be dispersed to form a suspension which had the desired plastering properties but which coalesced on standing overnight.

Reaction time=140 minutes: Product similar to that for 130 minute run, being somewhat harder but still sticky. It formed a suspension having very good plastering characteristics but which coalesced on standing overnight.

Reaction time=160 minutes: Similar to 140 minute run but product was somewhat harder. Suspension exhibited only a slight tendency toward coalescence and had very good plastering characteristics.

Reaction time=180 minutes: Similar to 160 minute run but dispersed resin particles showed no tendency to coalesce. Suspension gave filter cake which cured to hard non-porous sheath in about 45 hours at 200° F.

Reaction time=200 minutes: Product was still a very viscous fluid at reaction temperature but a solid having relatively little stickiness at room temperature. It formed non-coalescing suspension having very good plastering characteristics.

Reaction time=210 minutes: Product was soft plastic at reaction temperature and a tough elastic or rubbery solid at room temperature. It had the desired dispersion and plastering characteristics.

Reaction time=225 minutes: Product was tougher than in previous run but could be dispersed to form satisfactory sealing agent.

Reaction time=240 minutes: Product was very tough even at reaction temperature and was very difficult to suspend. The suspension, although lumpy, still had sealing characteristics but was undesirable as sealing agent.

Example III

A series of runs was made in which the ratio of phenol to formalin was varied. In each run, one part of sodium hydroxide per 100 parts of phenol was used as the catalyst and the reaction temperature was maintained at about 100° C. With a phenol/formalin ratio of 2 to 1, a product corresponding to the desired stage of condensation could not be obtained even when the reaction was carried out for as long as 16 hours. With a phenol/formalin ratio of 1 to 5, a suitable product likewise was not obtained in 10 hours. At ratios intermediate these values, products satisfactory for forming the sealing agent were obtained at the following reaction times:

| Phenol/formalin ratio | 1/1 | 1/2 | 1/3 | 1/4 |
|---|---|---|---|---|
| Reaction time, minutes | 218 | 142 | 150 | 225 |

Example IV

In another series of runs in which 100 parts of phenol were reacted with 300 parts of formalin in the presence of 1 part of sodium hydroxide, the following results were obtained by varying the reaction temperature:

| Temperature, ° C. | Time, minutes | Character of Product |
|---|---|---|
| 50 | 913 | no product formed. |
| 70 | 903 | too soft. |
| 80 | 660 | satisfactory. |
| 90 | 332 | Do. |
| 95 | 237 | Do. |
| 100 | 150 | Do. |

Example V

A mixture of 100 parts of cresylic acid and 300 parts of formalin were reacted at 100° C. for 152 minutes in the presence of 1 part of sodium hydroxide. The product was a tough elastic mass at room temperature. It formed a non-coalescing suspension with water, which plastered out on 10 mesh sand giving a filter cake that cured in 12 hours at 200° F. to a hard non-porous layer.

Example VI

A mixture of 100 parts of phenol, 100 parts of trioxymethylene (paraformaldehyde) and 100 parts of formalin was reacted at 100° C. in the presence of one part of sodium hydroxide. A sticky solid resin having a curdy appearance at room temperature was obtained after reacting for 220 minutes. This product formed a non-coalescing suspension which gave a filter cake that cured in 7 hours at 200° F. to a hard non-porous plug.

Example VII

A mixture consisting of 100 parts of urea and 200 parts of formalin was reacted without the aid of a catalyst for 100 minutes at 95–100° C. The product, which consisted of the total reaction mixture, was a somewhat viscous liquid at the reaction temperature and became a gelatinous solid when cooled to room temperature. It formed a non-coalescing suspension which gave a filter cake that cured in 2 hours at 200° F. to a hard non-porous layer.

With urea and formalin in the proportion of 1:2, good products may be obtained with reaction times generally within the range of about 90–250 minutes. However, if the proportion of these particular starting materials is changed substantially, it will be difficult to obtain a satisfactory sealing agent at any reaction time.

Example VIII

A mixture of 100 parts of phenol and 200 parts of furfural was reacted in the presence of 10 parts of sodium hydroxide (added as a 50° Bé. aqueous solution) at a temperature approximating 100° C. for a total time of 250 minutes. The product, consisting of the total reaction mixture, was a tar-like liquid at reaction temperature and a tough elastic solid at room temperature. It formed a non-coalescing suspension which gave a filter cake that cured in about 34 hours at 200° F. to a fairly hard layer. This product, although being useful as a sealing agent, was of poorer quality than generally desired in that the cured resin layer was somewhat porous and brittle.

Example IX

A mixture of 100 parts of melamine and 400 parts of formalin was reacted at 95–100° C. in the presence of 0.5 part of sodium hydroxide. The total time at the reaction temperature was 160 minutes. The product was a gelatinous solid, very similar to the best products obtained from phenol-formaldehyde using an alkaline catalyst. The product formed a non-coalescing suspension which was an excellent sealing agent. The suspension gave a resin layer which cured in 5½ hours at 200° F. to a hard non-porous sheath.

When the reaction of this example is carried out without the sodium hydroxide, the desired stage of condensation is reached in a much shorter time. This shows that with melamine and formalin as the reactants, sodium hydroxide acts as a retarder rather than a catalyst. An excellent product also may be prepared when the sodium hydroxide is omitted, although there may be some difficulty in stopping the condensation at the desired stage due to the speed of reaction.

In order to obtain a cured resin sheath having good mechanical strength, it is best to employ a relatively high pressure in forcing the suspension into the porous body or formation. We have found that the use of a high pressure generally results in a stronger cured resin layer than when a low pressure is used, presumably because of a more complete fusion of the plastered resin particles.

The sealing agents of the present invention may be mixed with a catalyst before use, if desired, and the amount of catalyst may be regulated so as to reduce the time of cure at the formation temperature. In sealing a formation by introducing the sealing agent into the borehole and forcing it into the formation, either the concentrated suspension or a dilute suspension of the resin may be used. It has been found that contamination of the sealing agent by minor amounts of drilling mud, such as may happen during actual use of the sealing agent in a well bore, does not cause any decrease in the plastering ability of the suspension nor does it cause any substantial loss in mechanical strength of the cured resin layer. However, drilling mud in amount over 50% in the suspension results in a resin layer having poorer mechanical strength and generally unsatisfactory for effecting a good seal.

We are aware that it has been proposed heretofore to incorporate a thermosetting resin or reactants capable of forming such resin in the drilling fluid circulated during the general drilling operation. The sealing agent herein described, however, is not a drilling fluid and is not suitable for use during the general drilling operation.

The method of sealing a porous formation traversed by a borehole by means of the sealing agent of the present invention is not herein claimed as that forms the subject matter of our copending application, Serial No. 609,928, filed of even date herewith and is fully described and claimed therein.

Also, sealing agents prepared from urea-formaldehyde and melamine-formaldehyde are not herein claimed, as they form the subject matter of our copending applications Serial Nos. 54,587 and 54,586, filed October 14, 1948.

We claim:

1. Method of preparing a sealing agent for sealing porous formations which comprises reacting phenol with formalin in the weight proportion of one part of phenol to 1–4 parts of formalin under catalyzed condensation conditions to form a thermosetting resin, conducting the reaction through a stage at which a resin phase precipitates and continuing the reaction until the resin has reached an intermediate plastic solid stage at which it is dispersible by stirring in water without the aid of an emulsifying agent to form a non-colloidal suspension stable for at least five hours, stopping the reaction when said intermediate plastic solid stage is reached whereby to obtain a partially condensed resin capable of further condensation to a hard infusible stage upon application of heat, and dispersing the resin in water to form, as the desired product, a non-colloidal aqueous suspension which, when forced into a bed of 10 mesh sand, will form a resin sheath at the face of the bed capable of thermosetting to a hard layer non-porous to drilling fluid.

2. Method of preparing a sealing agent for sealing porous formations which comprises reacting a reactant selected from the group consisting of phenol and cresylic acid with a reactant selected from the group consisting of formalin and furfural in the weight proportion of one part of the first-named reactant to 1–4 parts of the second-named reactant under catalyzed condensation conditions to form a thermosetting resin, continuing the reaction until the resin has reached an intermediate plastic solid stage at which it is dispersible by stirring in water without the aid of an emulsifying agent to form a non-colloidal suspension stable for at least five hours, stopping the reaction when said intermediate plastic solid stage is reached whereby to obtain a partially condensed resin capable of further condensation to a hard infusible stage upon application of heat, and dispersing the resin in water to thereby form, as the desired product, a non-colloidal aqueous suspension which, when forced into a bed of 10 mesh sand, will form a resin sheath at the face of the bed capable of thermosetting to a hard layer non-porous to drilling fluid.

3. A sealing agent prepared according to the method defined in claim 2.

4. Method according to claim 2 wherein an alkaline catalyst is employed.

5. Method according to claim 2 wherein an acid catalyst is employed.

6. Method according to claim 2 wherein the first-named reactant is phenol and the second-named reactant is formalin.

7. A sealing agent prepared in accordance with the method defined in claim 6.

8. Method according to claim 2 wherein the first-named reactant is cresylic acid and the second-named reactant is formalin.

9. A sealing agent prepared in accordance with the method defined in claim 8.

10. Method according to claim 2 wherein the first-named reactant is phenol and the second-named reactant is furfural.

11. A sealing agent prepared by the method defined in claim 10.

STEWART S. KURTZ, Jr.
JAMES S. SWEELY.

REFERENCES CITED

The following references are of record in the file of this patent:

UNITED STATES PATENTS

| Number    | Name     | Date          |
|-----------|----------|---------------|
| 1,392,849 | Plauson  | Oct. 4, 1921  |
| 1,673,797 | Brown    | June 19, 1928 |
| 1,976,433 | Cheetham | Oct. 9, 1934  |
| 2,247,764 | Nevin    | July 1, 1941  |